United States Patent Office 3,332,303
Patented July 25, 1967

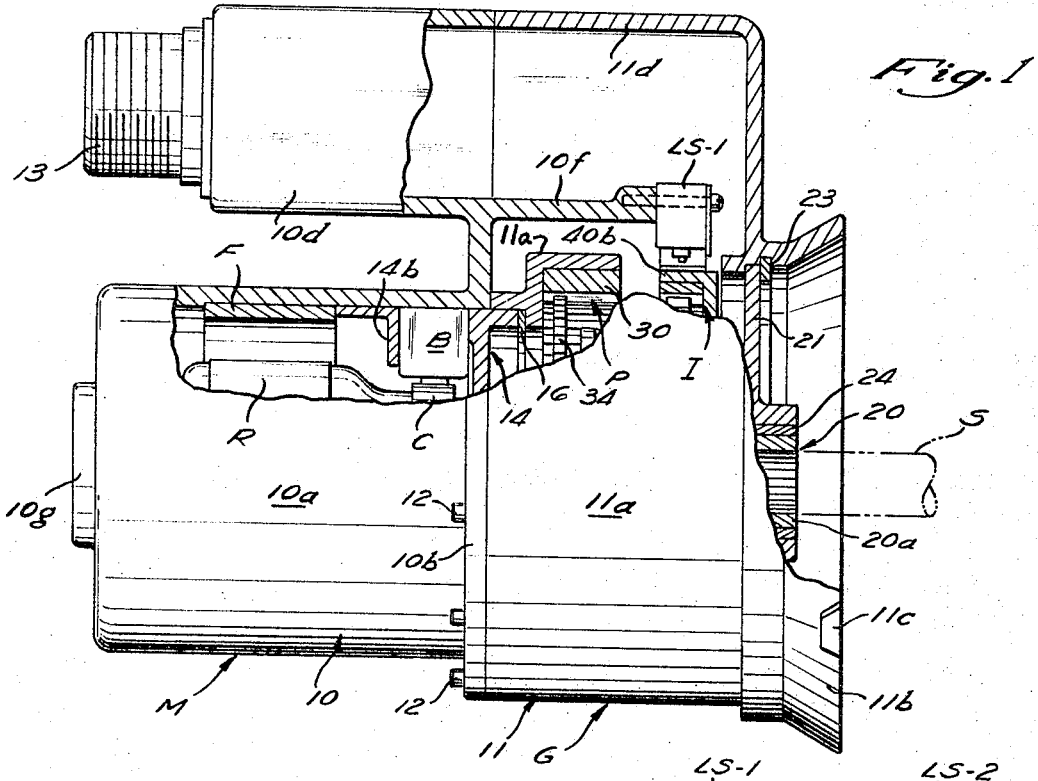

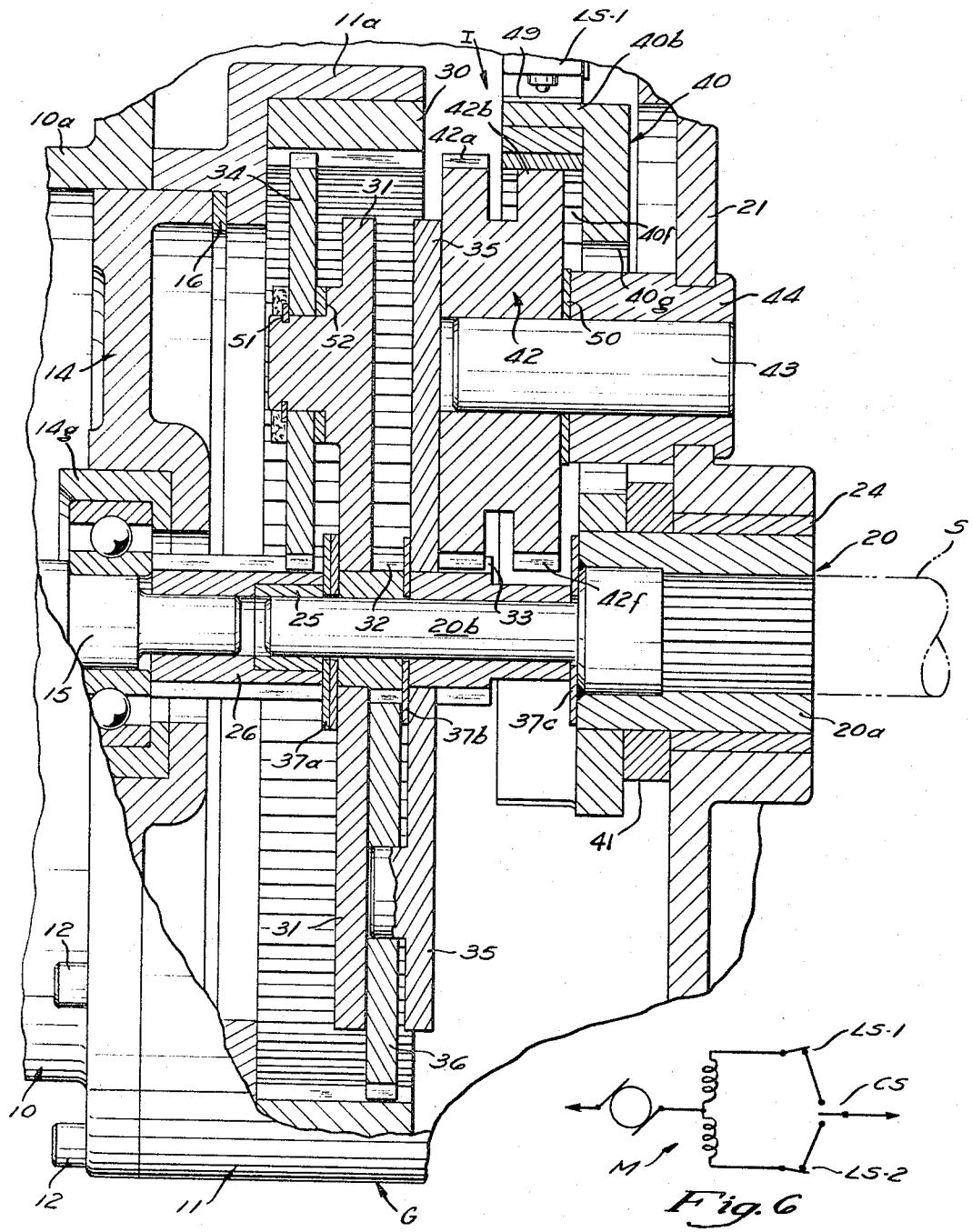

3,332,303
ROTARY ACTUATOR
Frank Z. Daugherty, Kent, Ohio, assignor to
Ametek, Inc., a corporation of Delaware
Filed Jan. 4, 1965, Ser. No. 422,974
13 Claims. (Cl. 74—801)

The present invention is concerned with rotary actuators, that is, combinations of a motor means producing rotary motion and means for applying the motion to an element to be rotated in a desired manner. More particularly the invention is concerned with the combination of motor means, reduction gearing and interrupted tooth gearing serving to rotate an element of a device to be actuated to, and to maintain the element at, a specific position.

In the prior art there is found a multiplicity of rotary actuator constructions whereby rotary motion is produced by motor means such as an electric motor and is applied through reduction gearing to a device to be actuated, such as a valve or a rotary switch for moving a part of the device from one position to another. Thus, for example, rotary actuators for plug or butterfly type valves have included an electric motor, a rotatable output element connectable with a stem or shaft operating the valve, and means for stopping the output element and therefore the valve at a desired position or positions, such as extreme valve-open, valve-closed, and at times selected intermediate, positions. Commonly the electric motor with appropriate circuitry is subject to an operator manipulated switch to start motor operation and further to the control of limit switches which cut off motor operation when the valve or output element has reached the desired position for which operation is initiated. The present invention though having broader applications will be described and discussed in terms of a valve actuator.

To determine the position at which an actuator output element, or device actuated, halts with termination of motor operation various expedients have been used. The problem usually is to attain a definite positioning without likelihood of damage to either actuator or actuated device.

In some cases, the friction of the system and the loading have been relied upon to cause the operated element or output element to stop at a satisfactory position after the motor is deenergized, or clutch mechanisms have been used responding to motor deenergization to disconnect the driving system at some point so that momentum of the motor rotor or other parts is ineffective thereafter to move the output or operated element. In other cases positive mechanical stops have been used for the output or operated element or an element moved therewith especially for full-open, full-closed operation, at times a clutch or coupling being included which either slips for a torque limiting action to avoid shock loading of the mechanism, as a mechanical stop is encountered, or is disengaged by a clutch element encountering such a stop to release the driven side of the mechanism from the driving side.

Such expedients have entailed various disadvantages, such as requiring relatively sturdy or heavy mechanism beyond the motor rotor to withstand either the expected or merely possibly occurring shock loading attendant upon use of positive mechanical stops; or inclusion of additional clutch or torque limiting devices; rather complex control circuitry; or where such are not used, an undesirable variability in the final stopping position or condition of the actuated device.

It is the general object of the present invention to provide a rotary actuator minimizing or obviating one or more of the above noted disadvantages of the prior art.

A more particular object is to provide rotary actuator mechanism adapted to rotate an element to and maintain it at a specific position without use of mechanical stops blocking the motion of the entire driving system and without use of torque limiting or clutch devices. A further object is to provide a rotary actuator without torque limiting or clutch means adapted to drive an actuated device to and stop it at an exact position, wherein lighter gearing and overall driving mechanism may be used then would be otherwise required. Another object is to provide an actuator readily assembled with proper alignment of parts. Other objects and advantages will appear from the following description and the drawings wherein:

FIG. 1 is a side view of a rotary actuator embodying the present invention shown with certain parts broken away;

FIG. 2 is a fragmentary sectional view of the reduction gearing and output mechanism;

FIG. 3 is a detail view of certain output gear elements;

FIG. 4 is a view similar to FIG. 3 but showing the essential region of a modification;

Figure 5:
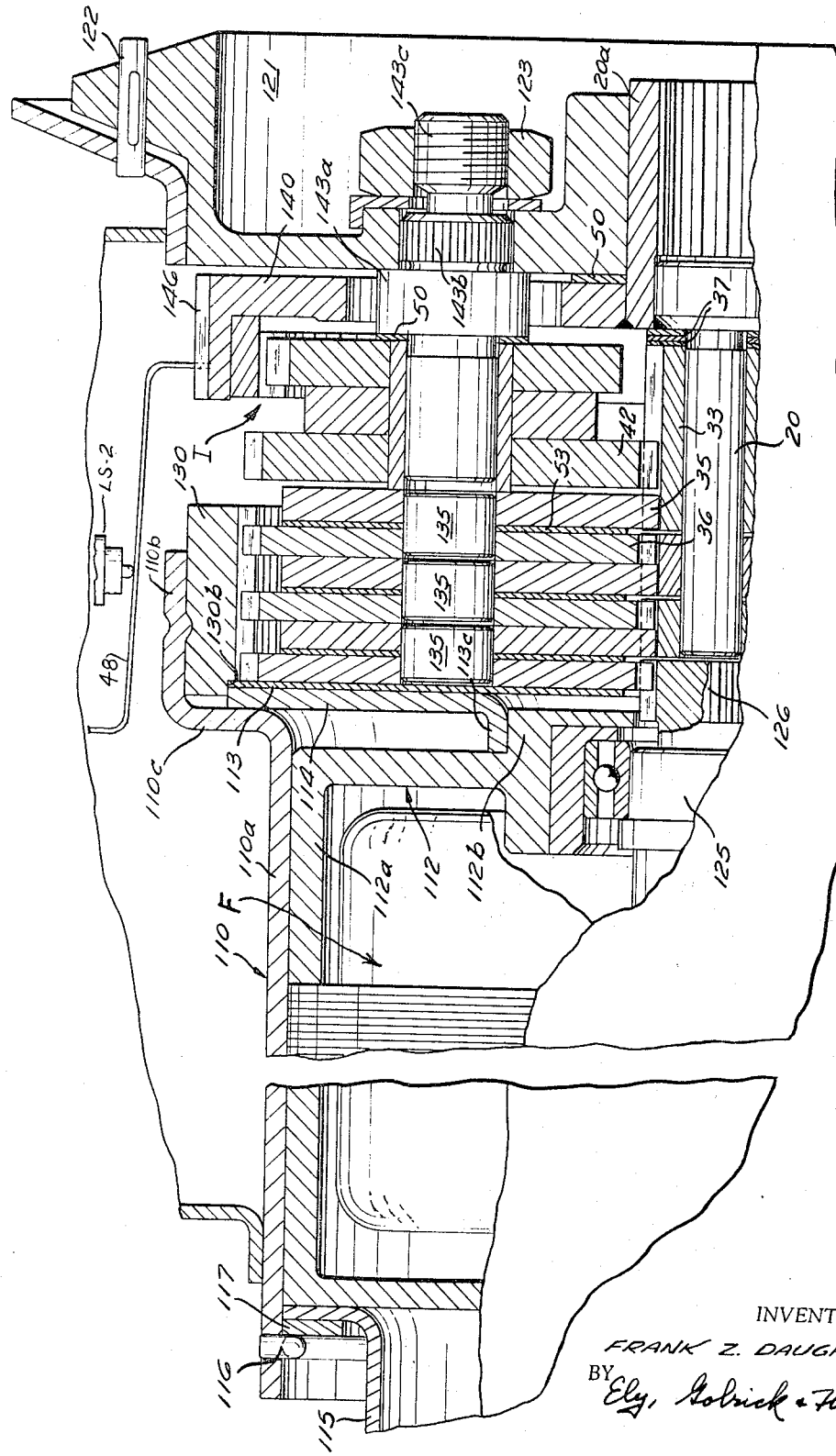
FIG. 5 shows a further modification embodying the invention.

FIG. 6 schematically represents an example of a control circuit.

In the drawings, FIG. 1 shows the general arrangement of one form of electric motor driven actuator unit embodying the invention comprised of a motor section M and a reduction gearing and control section G adapted for coupling to and driving rotationally by rotating between two positions a shaft-like element S shown in dotted-dashed lines of a device to be actuated under the control of appropriate motor control circuitry.

Cooperating main housing members 10, 11 with coaxially aligned hollow cylindrical portions 10a, 11a respectively enclosing the operative elements of the motor and gearing sections are secured together as by screws 12 through flange 10b threaded endwise into 11a; and the flared flange 11b serves as a base whereby the unit may be secured to the environment of use as by bolts through flange bosses 11c.

Housing member 10, as an integral structure includes a rectangularly tubular portion 10d extending parallel to 10a and an extension 10f projecting to the right in FIG. 1 into an integral box 11d projecting from the cylindrical portion 11a, providing an enclosure for the limit switches LS-1, LS-2 bolted onto the end of 10f, and in conjunction with 10d also for wiring leads (not shown) between the switches, the motor and the fitting 13 on the free end of 11d for a screwed cable connection to a power and control lead cable (not shown).

The motor section includes a field F with core secured (by means not shown) in a counterbore of 10a, and a rotor or armature R with shaft 15 rotatably supported by suitable bearing means in bearing sockets respectively formed at 10g of the end wall of main housing member 10 and at 14g (see FIG. 2) in a radial wall or web of a sleeve 14 also received in the counterbore of 10a to seat against the end of the field core. Sleeve 14 includes radially bored formations 14b to receive each a motor brush holder assembly B adjacent the commutator C, and a projecting right end received in the counterbored open left end of the cylindrical portion 11a. With suitable shims or a washer at 16, housing member 11 fitted on 14 is not only aligned thereby with 10a, but also can serve to clamp 14 under force of screws 12 in position with the brush axis suitably located relative to the field.

In the gearing section G, a two-stage high reduction planetary gear mechanism P and intermittent gear mechanism I are provided through which motor M drives the output shaft element 20 rotatably supported in alignment with the motor shaft 15, ultimately by the motor shaft at its left, and at its right by a disc-like radial wall element 21 secured in the counterbored open right end of 11a by a split expansion ring 23 received in a suitable housing groove.

Conveniently for fabrication and assembly, shaft 20 may be made of two pieces secured together as by brazing or in other suitable manner; namely, an internally splined sleeve-like portion 20a journalled in sleeve bearing 24 in a centrally apertured boss of disc 21 providing a splined socket to receive and couple with the driven element S such as a valve stem; and an elongated solid portion 20b with enlarged right end secured in a counterbore of sleeve 20a, and its left end journalled by a sleeve bearing 25 in the outboard end of a pinion 26 which is in turn secured to rotate with the reduced end of motor shaft 15.

The two-stage planetary gearing is comprised of an internally toothed ring gear 30 fixed in 11a coaxially to the aligned shafts 20, 15; planetary carrier disc member 31, 35 splined on respective hubs rotatable on 20b and having the form of sun gears 32, 33, respectively carrying each preferably a plurality of planet gears 34, 36, meshing both with the ring gear and respectively with pinion 26 and gear 32 as the sun gears for the first and second stages. Again for simplicity of fabrication, the disc portions of the carriers, including integral planet stub shaft formations and the respective hubs with gear formations may be made separately for example by powdered metal techniques, and thereafter secured for rotation as a unit in any suitable fashion.

With the sector gear plate 40 of the hereinafter described intermittent gearing I secured on and extending from the circumference of part 20a of the output shaft and spaced from end wall disc 21 by a washer or thrust bearing 41 preventing outward axial displacement of 20, and the first stage input pinion 26 axially supported at the left as by the inner race of the adjacent motor bearing, the planet carriers and hubs are aptly positioned by the interposed hub spacer thrust washers 37a, 37b, 37c, and, the latter being of sufficient diameter, the carriers may be merely splined to respective hubs.

The intermittent gearing mechanism (see also FIG. 3) includes the above mentioned sector gear plate 40 in the form of a right angle sector having an arcuate slot 40g and an arcuate peripheral flange 40b provided on its inner face with a set of teeth 40f between a pair of like arcuate recesses 40c, 40d, on centers spaced 90° relative to the axis of shaft 20.

A double or cluster gear 42, rotatable on a stub shaft 43 mounted on the wall-forming disc 21 through a sleeve 44 to project through sector plate slot 40g, has two axially spaced external simultaneously rotating gear formations, namely formation 42a, meshing with the planetary system output or final sun gear 33, and an interrupted gear formation 42b including a cylindrical periphery 42c and a tooth set 42f one more in number (e.g., 6) than the teeth 40f. Though not all teeth would here be used, set 42a may conveniently extend around the entire circumference. The cylindrical portion 42c of the circumference 42b has substantially the diameter of the pitch circle of the tooth set 42f, and the arcuate recesses 40c, 40d are shaped as portions of a cylinder coinciding with the pitch circle of 40f and merging into portions of cylinders of like diameter with axes of curvature in the respective planes passing through their centers and the axis of the shaft 20; and clearances can also be provided adjacent the end teeth in 42f.

With the arrangement shown, a further reduction is had in driving from sun gear 33 through gear formations 42a and 42b to 40f. Further to be seen in FIG. 3 as either extreme position is reached by sector plate 40, a respective arcuate recess 40c or 40d passes over onto the cylindrical portion 42c thereby being stopped in position, so that output shaft 20 and hence actuated shaft S are stopped in either of extreme positions 90° apart. As each position is reached, and the plate 40 and shaft 20 become locked against continued rotation, the gear member 42 may yet rotate or overtravel approximately a half-turn further, representing some hundreds of motor shaft rotations.

Ears 46, 47, at opposite ends of the flange 40b, in encountering spring fingers 48, 49, cause actuation of a respective one of the limit switches, since the cylindrical portion 11a within the confines of box 11d is slotted to accommodate the swing of the ears. The ears may be bent as required to cause actuation of the limit switches at precise desired times.

In the first stage, the planets, as shown for planet 34, are simply secured with an underlying thrust washer 52 on the carrier stub shaft projection, with which a lubricating felt may be associated, by a contractible split ring 51; while the planets in the second stage, as planet 36, may be simply held from axial displacement by being sandwiched between their carrier disc 35 and the free face of carrier disc 31 thrust washers 52 being used if desired. Similarly gear member 42 may be held on shaft 43 sandwiched between the free face of carrier 35 and the sleeve 44 with interposed thrust washer 50.

A modification is shown by FIG. 4 representing the region of structure primarily differing from what has already been described. Here the output shaft 20 again carries a right angle sector plate 140 having the external tooth set 140f between arcuate recesses 140c, 140d, for cooperation with the teeth 142d and cylindrical surface 142c on the interrupted gear portion 142b of a gear driven by the output of reduction gearing. The limit switches LS-1 and LS-2 are here located so that actuating buttons hereof are contacted by the side edges of plate 140 at each of its extreme positions.

Here of course if 142b is a portion of a gear such as 42 with a circumferentially toothed portion driven by the sun gear of a planetary train, as previously described then the axes of shaft 20 and of the motor would preferably be offset parallel to each other, or an idler gear train would have to be used to retain the reduction without undue size.

Under the speeds and loads for which the illustrated unit is intended the simple component structures, bearings and spacers as shown and described are sufficient, but obviously more sophisticated design on these points might be desirable for some situations.

The constructions of the sector gear plate and driving gear with interrupted teeth as shown in FIGS. 3 and 4 represent embodiments of the invention in an actuator intended for driving an operated device such as a valve to and holding it precisely at two extreme positions, though with the possibility of stopping at intermediate positions not so precisely predetermined by the mechanism itself; for which purposes control circuitry is well known for various types of AC or DC electric motors M such as induction motors, series universal motors and others which can be reversed by appropriate connections.

In FIG. 6, for example, with a series motor having two field windings, each at one end permanently connected with reversed polarity to one brush, and the other brush connected to one side of the power source, a simple control circuit has been used comprised of a three position (e.g. "open," "closed," "off") manual selection switch for applying power selectively through respective normally closed limit switches such as LS-1 and LS-2 to the respective other ends of the field windings.

With this control circuit, the selector switch may be set to "open" position, and the power is applied to the field for motor rotation driving the valve toward open position. The switch tripping ears or lugs 46, 47 are preset to cause the limit switch through which power is applied to be actuated to non-normal open condition as the teeth 42f disengage from the sector plate teeth 40f and a corresponding one of the arcuate recesses 40c or 40d receives the cylindrical periphery 40c. The motor is thus cut off, the output shaft locked in position and overrun of the motor by inertia to the extent of the free rotation corresponding to the free remainder of the cylindrical surface position 40c is permitted. This, with a high reduction ratio, usually represents considerable latitude for the actual setting of the switch actuating lugs or ears for variation in condition of the mechanism; and of course the ears may be set to open at an earlier point, where it is yet certain that the mechanism will coast into the locked relation of 40 and 42c. The reverse action occurs thereafter when the selector switch is set to "close."

Thus whether the selector switch is as a normally-off device, or simply set to remain at selected position, the motor is automatically cut off as each extreme position is reached and exactly maintained. Also, it is possible to to initiate action by selector switch setting to move the actuated device approximately to an intermediate setting upon the attainment of which the selector switch is set to "off," as an alternative to a more sophisticated mechanism where the plate 40, perhaps of greater angular size, has a tooth set interrupted by one or more arcuate recesses corresponding to pre-determined intermediate positions of the output element with addition of one or more limit switches, usually also relays (where simplicity of operator action without elaborate switch camming means is desired) and corresponding complexity of control circuitry.

In fragmentary FIG. 5 is shown another modification of the FIGS. 1–2 structure, and incidently showing a three-stage planetary reduction gearing system. Whereas the enclosure structure of FIGS. 1–2 contemplates fewer parts fabricated by various casting techniques, that of FIG. 5 is adapted for use even of cast elements of simpler form, with much of the enclosure comprised of spun, drawn or formed metal components.

Here circumferentially to enclose the motor and gear elements, there is a main housing member 110 integrally comprising a longer cylindrical portion 110a and, joined thereto by a radial portion 110c, portion 110b terminating in a flare 110d. Portion 110a receives the inwardly directed cylindrical skirts 111a, 112a of motor bearing end brackets 111, 112 with the motor stator or field stack F located therebetween.

In the innermost region of the cylindrical portion 110b the metal is rolled into a circumferential external groove of the ring gear 130 thereby securing in axial position gear 130 and also the centrally apertured discs 113, 114 having outer margins clamped between the radial shoulders provided by 110c and a ring gear internal rabbet 130b. With a short integral central cylindrical flange 113c fitted onto the right end of the end bracket bearing socket hub formation 112b and the close circumferential fit of the disc 113 in the cylindrical part of the rabbet 130b, the ring gear 130 and the shaft 115 of the motor rotor R are located coaxially to each other.

The two end brackets and field elements may be secured axially and rotationally in 110a in any suitable manner, as by locally deforming the latter into grooves, openings or notches in those elements. For example, where a reversible capacitor split phase induction motor is used, the radially flanged open end of a removeable, capacitor-housing cupped shaped member 115 may be received and secured in the open left end of 110a by a split expansible spring wire retainer or clip ring 116 formed with diametrically opposed projecting portions engaged in corresponding apertures in 110a overlying a flat spacer ring 117; which arrangement also may provide partially the axial securement of the motor elements.

An end wall, opposite the wall afforded by 110c or better disc 113, is provided for the gearing housing portion 110b by a member 121 having an externally cylindrical portion fitted into 110b, member 121 being secured by a pin 122 through the flared end 110b and the integral flange 121b. Preferably the internal diameter of 110b, receiving 121 is slightly larger than that receiving ring gear 130 facilitating installation of the latter.

The shaft 143 for the cluster gear 42 here has an enlarged portion 143a bearing against the inside of, and a knurled portion 143b engaged in an apertured thickened part of, the radial wall portion of 121, and further a threaded projecting end 143c for a securing nut 123.

Here the enlarged output shaft portion 120a carrying sector plate 40 is journalled directly in an axially extended central hub-like formation of 121 affording a cantilever support for the shaft, since the inner end thereof is not piloted in the motor shaft end. The journalling of the shaft directly in the metal of 121 is possible even though an aluminum alloy casting or other soft or galling metal is used, because of the extremely low speeds, short travel and intermittent use involved.

The motor shaft may be formed integrally with a pinion 126 as the sun gear for the input into the first of the three planetary stages. In each planetary stage, there is used an arrangement as in the third stage, where short stub shafts 135 are pressed into the carrier disc 35 supporting planetaries 36 with interposed spacer and thrust washer plates 53. The planets and cluster gear 42 or sleeve bearing of the latter being in sliding contact with the backs of the preceding stage carrier and at the first stage, with the thin spring metal disk 114 as a wear take up follower, the gearing elements are axially located between 113 and 121, the stub shafts having end clearances for this purpose. The portions 110a and 110b are apertured respectively for motor leads to limit switches and a connector fitting, and for access of limit switch actuating spring fingers to the sector plate 40 as in the first described modification; but to adapt member 110 for simple fabrication, as by hydroforming techniques, the enclosure and the mounting for the limit switches and connector fitting are not provided as an integral part of member 110, but by a distinct structure as by a switch supporting drawn sheet metal cap 127 held on 110 by a clamping ring 128 embracing member 110. With such arrangement as that of FIG. 5 a lower cost housing is obtained; and the use of the disc 113 fitted on a surface of 112 machined coaxially with the bearing socket therein and engaged in the rabbet 130b ensures coaxiality of 130 with the motor shaft, without requiring close tolerances in the fit between 112 and 110, for example. Also the planetary gearing readily may be inserted as a sub assembly with 121.

I claim:

1. In a rotary actuator unit for driving, by electric motor means, between two angular positions a rotatable element of a device to be actuated, at least one of which positions is predetermined, the combination of: a housing, an output shaft rotatable in said housing adapted to drivingly engage said element, motor means including a motor shaft supported by said housing, speed reduction gearing means in said housing including an input pinion on the motor shaft and an output element, said output element having an interrupted tooth formation comprised of a set of gear teeth extending over a portion of and a cylindrical surface portion over the rest of the output element circumference, the pitch circle of said teeth lying substantially in the cylindrical surface, a gear element on the output shaft having a set of teeth meshable with the first said set and at one end terminating in a short arcuate recess adapted to engage a limited part of the cylindrical portion of said output element as said output element drives said output shaft through said gear element to said predetermined position and runs beyond a meshed relation, whereby after attainment of said position certain overrunning of said motor and speed reduction gearing is allowed.

2. The combination of claim 1 including position sensing means actuated by an element rotated at the same rate as and with said output shaft and effective to cut off said motor means approximately at the time said output shaft enters said predetermined position.

3. The combination of claim 1, wherein said gear element has external teeth.

4. The combination of claim 1, wherein said gear element has internal teeth.

5. The combination of claim 1, wherein the teeth set on the gear element terminates at both ends in a respective said arcuate recess, whereby two angular positions are predetermined at which output shaft rotation is terminated with permitted overrunning.

6. The combination of claim 5 including position sensing means actuated by an element rotated at the same rate as and with said output shaft and effective to cut off said motor means approximately at the times said output shaft enters said positions.

7. The combination of claim 1, wherein said reduction gearing is comprised of planetary gearing, with internally toothed ring gear means fixed in said housing coaxially with said motor shaft and with said pinion as an input sun gear, and having a planet carrier geared to and driving said output element.

8. A rotary actuator device comprising: reversible motor means producing a rotary motion, reduction gearing means driven by the motor means and driving a first interrupted tooth gear element including a set of external teeth over part of its periphery and a coaxial arcuate surface over the remainder, a rotatably mounted output element and a second interrupted tooth gear element rotatable therewith and said second element having a set of teeth meshable with the teeth of the first element and located between like arcuate recesses adapted to receive the said arcuate surface of the first element whereby the second element is drivable between two angular positions wherein it is stopped against further rotation by the said elements running out of meshed relation and respective recesses engaging with said arcuate surface, whereby overrunning of the motor and gearing means is permitted, and control means for said motor means including cooperating means respectively moveable with said second element and fixed relative to the axis of the first element adapted to cut off said motor means as the second element comes approximately to each of said positions.

9. In a rotary actuator unit for driving, by electric motor means, between two angular positions a rotatable element of a device to be actuated, at least one of which positions is predetermined, the combination of: housing means including a cylindrical motor portion; an output shaft rotatable relativce to said housing adapted to drivingly engage said element; motor means including a field core supported in said cylindrical motor portion, a motor shaft bearing supporting end bracket telescoped into said cylindrical portion against an end of said field core and cooperating with means on the opposite end of the core for securing the core in axial position, and a motor shaft supported by said housing means through said bracket; speed reduction gearing means in said housing means including an input pinion on the motor shaft, an output element, and planetary gearing including a ring gear concentric with said input pinion; means mounted on said end bracket and engaging said ring gear for locating the ring gear coaxially of said motor shaft and input pinion; a removable end wall portion in said housing means spaced from the region of said end bracket and defining therewith a gearing enclosing space in said housing means, said end wall portion rotatably supporting said output element with axis in parallel relation to said motor shaft and also said output shaft in parallel relation to the axis of said output element, an interrupted tooth formation on said output element comprised of a set of gear teeth extending over a portion of and a cylindrical surface portion over the rest of the output element circumference, the pitch circle of said teeth lying substantially in the cylindrical surface; a gear element on the output shaft having a set of teeth meshable with the first said set and at least one end terminating in a short arcuate recess adapted to engage a limited part of the cylindrical portion of said output element as said output element drives said output shaft through said gear element to said predetermined position and turns beyond a meshed relation whereby after attainment of said position certain overrunning of said motor and speed reduction gearing is allowed.

10. The combination of claim 9 wherein said output shaft is aligned with and has an inner end piloted in said motor shaft, with planet carrier means of said planetary gearing relatively rotatably supported on said output shaft.

11. The combination of claim 9 wherein said housing means is comprised of a first member having a body of generally hollow cylindrical form open at one end at least to receive said end bracket, a second generally hollow open ended cylinder with one end secured endwise to the first member and the second end closed by said removable wall portion and having said ring gear mounted therein proximate to but spaced from said one end; and to provide said means for coaxially locating said ring gear, said end bracket having a cylindrical flange projecting out of the first member and receiving thereover the said one end of the second member thereby to locate the ring gear coaxially of the motor shaft and input pinion.

12. The combination of claim 9, wherein said housing means is comprised of an integral hollow member having a first cylindrical portion providing said motor portion and a second cylindrical portion of enlarged diameter joined to the first by a generally radial portion forming a shoulder; and to provide said means coaxially locating said ring gear, a disc-like plate centrally apertured for fitting onto a bearing socket receiving portion of the end-bracket and having a periphery received in an internal rabbet of the ring gear; the enlarged end being closed by said wall portion.

13. The combination of claim 12, having a centrally hardened wear plate disc disposed on the outward side of said disc-like plate and received in said rabbet, and cooperating with said end wall for coaxially retaining plant carrier means and said output element with spacing means therebetween in assembled relation.

References Cited

UNITED STATES PATENTS

| | | | |
|---|---|---|---|
| 2,073,348 | 3/1937 | Merkle | 74—435 |
| 2,917,939 | 12/1959 | Harris | 74—435 |

DONLEY J. STOCKING, *Primary Examiner.*

DAVID J. WILLIAMOWSKY, *Examiner.*

L. H. GERIN, *Assistant Examiner.*